C. M. & D. E. Hall,
Cultivator.
No. 27,627.　　　　　　　Patented Mar. 27, 1860.
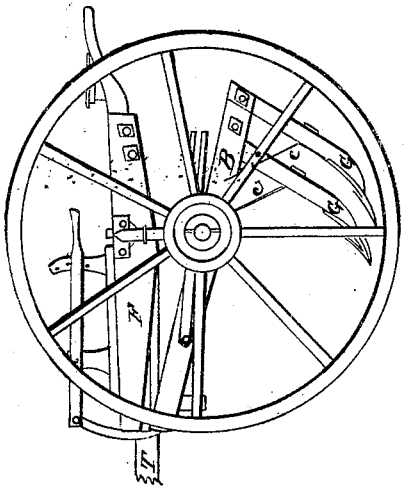
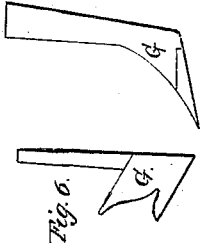
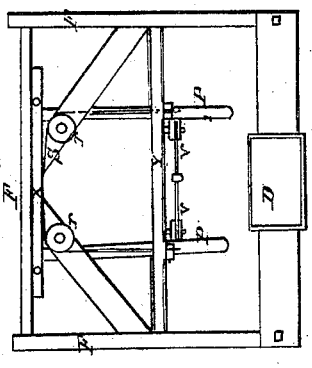
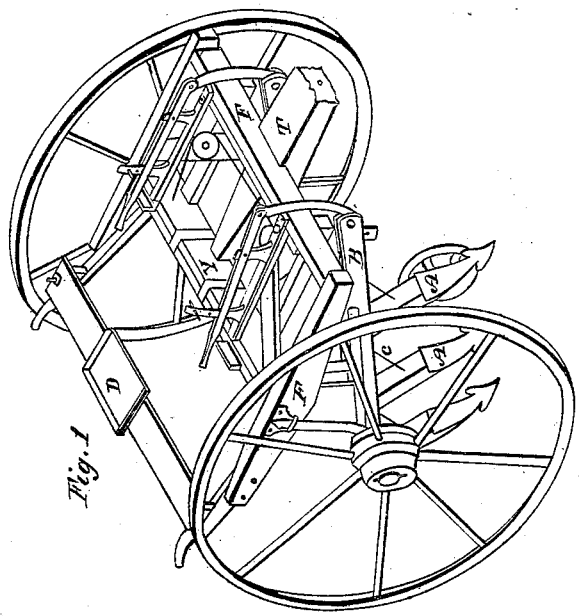
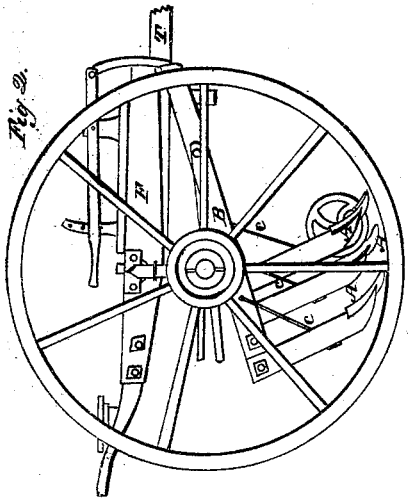
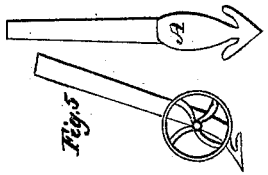

UNITED STATES PATENT OFFICE.

CYRUS M. HALL AND DAVID E. HALL, OF UNIONTOWN, ILLINOIS.

IMPROVEMENT IN CULTIVATORS.

Specification forming part of Letters Patent No. 27,627, dated March 27, 1860.

*To all whom it may concern:*

Be it known that we, CYRUS M. HALL and DAVID E. HALL, both of Uniontown, in the county of Knox and State of Illinois, have invented certain Improvements in Cultivators, by which we have rendered the same implement useful and convenient both for a hilling-plow and also useful for splitting corn-rows in old fields; and we hereby declare the following to be a full and true description thereof, reference being had to the drawings herewith presented, which drawings constitute a part of said description.

The nature of our invention consists in so constructing and arranging the several parts hereinafter described as to enable one person to guide the cultivator while he also drives the team, thereby enabling him to perform as much work with two horses in a day as can be done in three days in the old way with the single horse and plow or cultivator.

Figure 1 is an isometrical view of the carriage, having the tongue and whiffletree removed in order to show the several parts. F F is the frame, mounted on wheels; and A A are the shovels as used for a cultivator, the left side being furnished with similar appurtenances when used for cultivating small corn. It may be noticed that the shovels A are cut out (or barbed) in a peculiar form (see Fig. 5) for the purpose of allowing a portion of the dirt to fall back through the apertures into the furrows, thereby leaving the ground more level and in much better order than when broad entire shovels are used. Those shovels are secured to movable beams B B, which are attached to the frame F in such way as to be movable to the right and left at the option of the operator, as will be hereinafter more fully described.

Fig. 3 is a top view of the frame as seen without the top levers in order to show the straps *s* and their pulleys *r* and *r*. This strap, fastened to the cross-bar *x*, extends round the pulley *r* and through the axle *y*, over a small roller, down to the treadle *p*. This cross-bar *x* is movable endwise, and carries the main pivots on which the beams are secured, so that the operator can, by pressing one foot on the treadle, instantly bring the shovels all to the right or left, as occasion may require. This he can do without using his hands for the purpose. There is also a strap leading over the pulleys *v* and *v*, leading down to the same treadles, and is connected to another cross-bar, whose office is to move the after ends of the beams in the same time and the same direction. This bar has been removed to show the pulleys. This bar has two studs (or pillars) extending downward between the beams, and causes the beams to be moved both ends alike. It may be seen at Fig. 5 that the forward shovel has a revolving colter or wheel with curved arms. The arms have knife-edges, which cut against the shovel, thus cutting and pulverizing the lumps of dirt, which are gathered in by the shovel nearest to the corn. When we use this implement as a hilling-plow we change the shovels.

Fig. 4 is a side view of the same when used for hilling, having two larger shovels on each side, G and G. We also use it for splitting corn-rows on old fields by shifting the beams and shovels from right to left. So the right beam is on the left side and the left beam and shares on the right. Consequently the two forward shares turn a double furrow in the middle between the rows and the two hindmost shares split the hills and turn them into the furrows. The beams can be brought nearer together and placed at any desired distance apart by using a number of different holes in the frame for the pivots to which they are attached. We have found this arrangement to be particularly well adapted to plowing old fields, especially for sowing, where it is essential to lay the ground smooth.

What we claim as our invention is—

The general arrangement and combination of the revolving colter with knife-edged arms, the shovels A, made with flukes, (or barbs,) the beams B B, the cross-bar X, straps S, rollers *r r*, treadles P P, and the pin or pivot on which the beam B hangs, all constructed as above described, and for the purpose set forth.

In testimony whereof we hereto subscribe in presence of two witnesses.

CYRUS M. HALL.
    DAVID E. HALL.

Witnesses:
 OWEN BETTERTON,
 MARY J. BETTERTON.